(12) United States Patent
Olofsson et al.

(10) Patent No.: US 9,094,224 B2
(45) Date of Patent: Jul. 28, 2015

(54) ACKNOWLEDGED MULTICAST CONVERGENCE

(75) Inventors: Stefan Olofsson, Dubai (AE); IJsbrand Wijnands, Leuven (BE)

(73) Assignee: Cisco Technology, Inc., San Jose, CA (US)

(*) Notice: Subject to any disclaimer, the term of this patent is extended or adjusted under 35 U.S.C. 154(b) by 381 days.

(21) Appl. No.: 13/563,475

(22) Filed: Jul. 31, 2012

(65) Prior Publication Data

US 2014/0036913 A1 Feb. 6, 2014

(51) Int. Cl.
*H04L 12/28* (2006.01)
*H04L 12/18* (2006.01)
*H04L 12/761* (2013.01)
*H04L 12/705* (2013.01)

(52) U.S. Cl.
CPC ............ *H04L 12/1868* (2013.01); *H04L 45/16* (2013.01); *H04L 45/18* (2013.01)

(58) Field of Classification Search
CPC ................................. H04L 12/28; H04L 12/56
See application file for complete search history.

(56) References Cited

U.S. PATENT DOCUMENTS

| 5,519,704 | A | 5/1996 | Farinacci et al. |
| 7,512,106 | B2 | 3/2009 | Van Tran et al. |
| 7,707,300 | B1 | 4/2010 | Champagne |
| 7,894,365 | B2 | 2/2011 | Li et al. |
| 1,023,157 | A1 | 9/2011 | Vasseur et al. |
| 8,171,163 | B2 | 5/2012 | Li et al. |
| 2002/0150094 | A1* | 10/2002 | Cheng et al. .................. 370/389 |

FOREIGN PATENT DOCUMENTS

EP 2548343 A1 1/2013

OTHER PUBLICATIONS

Atlas, et al., "An Architecture for Multicast Protection Using Maximally Redundant Trees", Routing Area Working Group, Internet Draft, draft-atlas-rtgwg-mrt-mc-arch-00, Mar. 2, 2012, 30 pages, The Internet Engineering Task Force.

* cited by examiner

*Primary Examiner* — Andrew Lai
*Assistant Examiner* — Leon Andrews
(74) *Attorney, Agent, or Firm* — Parker Ibrahim & Berg LLC; James M. Behmke; Kenneth J. Heywood

(57) ABSTRACT

In one embodiment, a device connected to a network as part of a multicast tree receives a revised unicast routing and distributes the revised unicast routing and a query packet to a downstream device in the multicast tree. The device receives an acknowledgement message from the downstream device based on the query packet and determines a new multicast route based on the revised unicast routing and the acknowledgement message from the downstream device.

20 Claims, 8 Drawing Sheets

US 9,094,224 B2

ACKNOWLEDGED MULTICAST CONVERGENCE

TECHNICAL FIELD

The present disclosure relates generally to computer networks, and, more particularly, to convergence of multicast networks.

BACKGROUND

In computer networks, packets of data are sent from a source to a destination using a number of network elements and links according to various routing protocols. Network elements, such as routers, direct the packets along one or a plurality of links away from the source and towards the destination.

A routing loop may occur during transmission of the packets through the network, such as when an error or failure occurs. As a result, in a group of routers, the path to a particular destination may form a loop, and packets are repeatedly sent back and forth among the group of routers without reaching the intended destination.

In an Internet Protocol (IP) Multicast network where IP Multicast tree building is managed by either Protocol-Independent Multicast (PIM) or multicast Label Distribution Protocol (mLDP), the Unicast control plane plays a fundamental role in ensuring that the information provided to the Multicast control plane is accurate from the perspective of what the current network topology actually is. When the network experiences a link and/or node failure, there is a significant chance that the Multicast control plane, in the effort of trying to restore connectivity for the IP Multicast traffic, will act before the Unicast control plane it is dependent on has been able to converge and reflect the updated topology. The reason for this behavior is that networks supporting IP Multicast services rely on multiple, "ships-in-the-night," protocols that act independently to build and maintain the necessary state that is associated with the successful delivery of IP Multicast traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more aspects of the disclosure, a method is provided and may comprise receiving a revised unicast routing and distributing the revised unicast routing and a query packet to a downstream device in a multicast tree. An acknowledgement message is received from the downstream device based on the query packet and a new multicast route is determined based on the revised unicast routing and the acknowledgement message from the downstream device.

DESCRIPTION

A computer network is a geographically distributed collection of nodes/devices interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Figure 1:
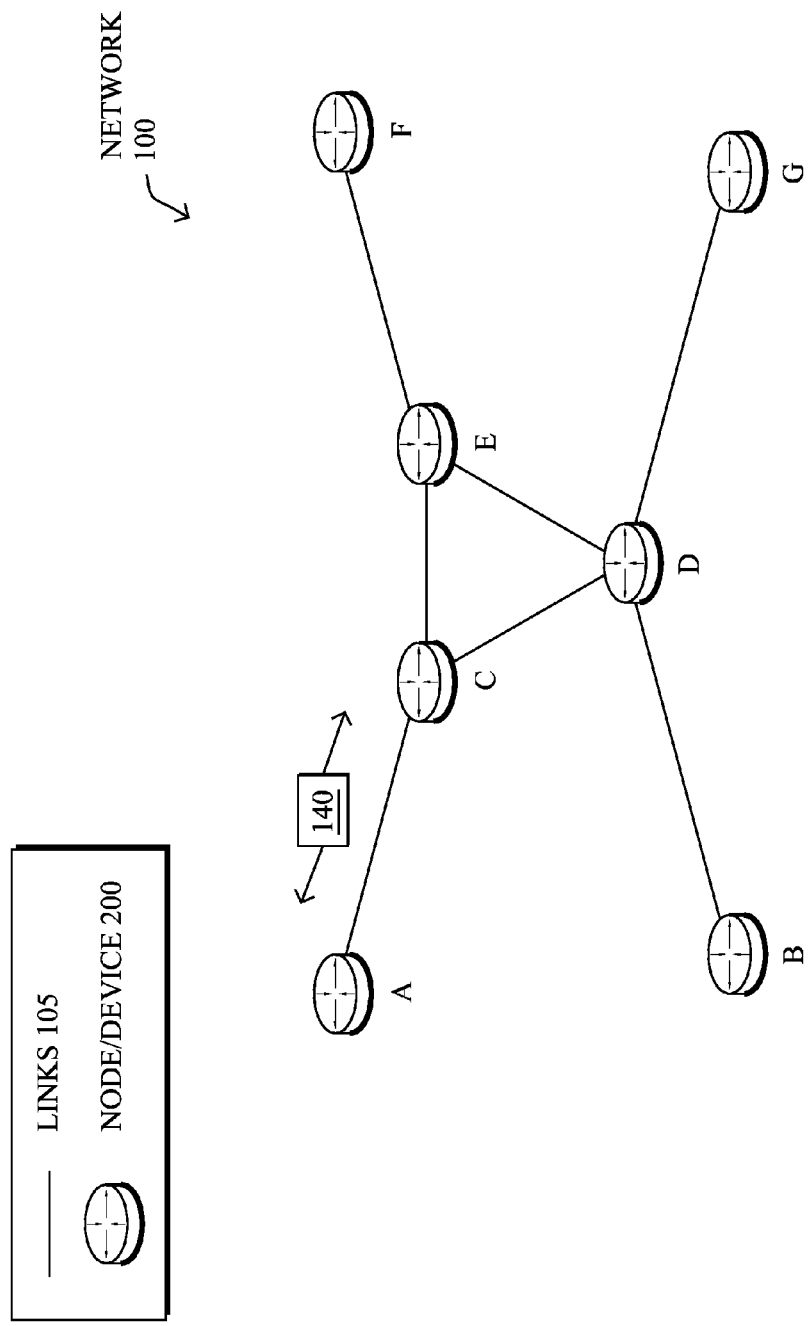
FIG. 1 illustrates an example communication network.

FIG. 1 is a schematic block diagram of an example simplified computer network 100 illustratively comprising nodes/devices 200 (e.g., labeled as shown as "A" through "G") interconnected by various methods of communication. For instance, links 105 may be wired links or shared media (e.g., wireless links) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while computer network 100 is shown in a certain orientation, computer network 100 is merely an example illustration that is not meant to limit the disclosure.

Data packets 140 may be exchanged among nodes/devices 200 of computer network 100 using predefined network communication protocols such as certain known wired protocols, wireless protocols, or other protocols where appropriate. In this context, a protocol consists of a set of rules defining how the nodes/devices 200 interact with each other.

Figure 2:
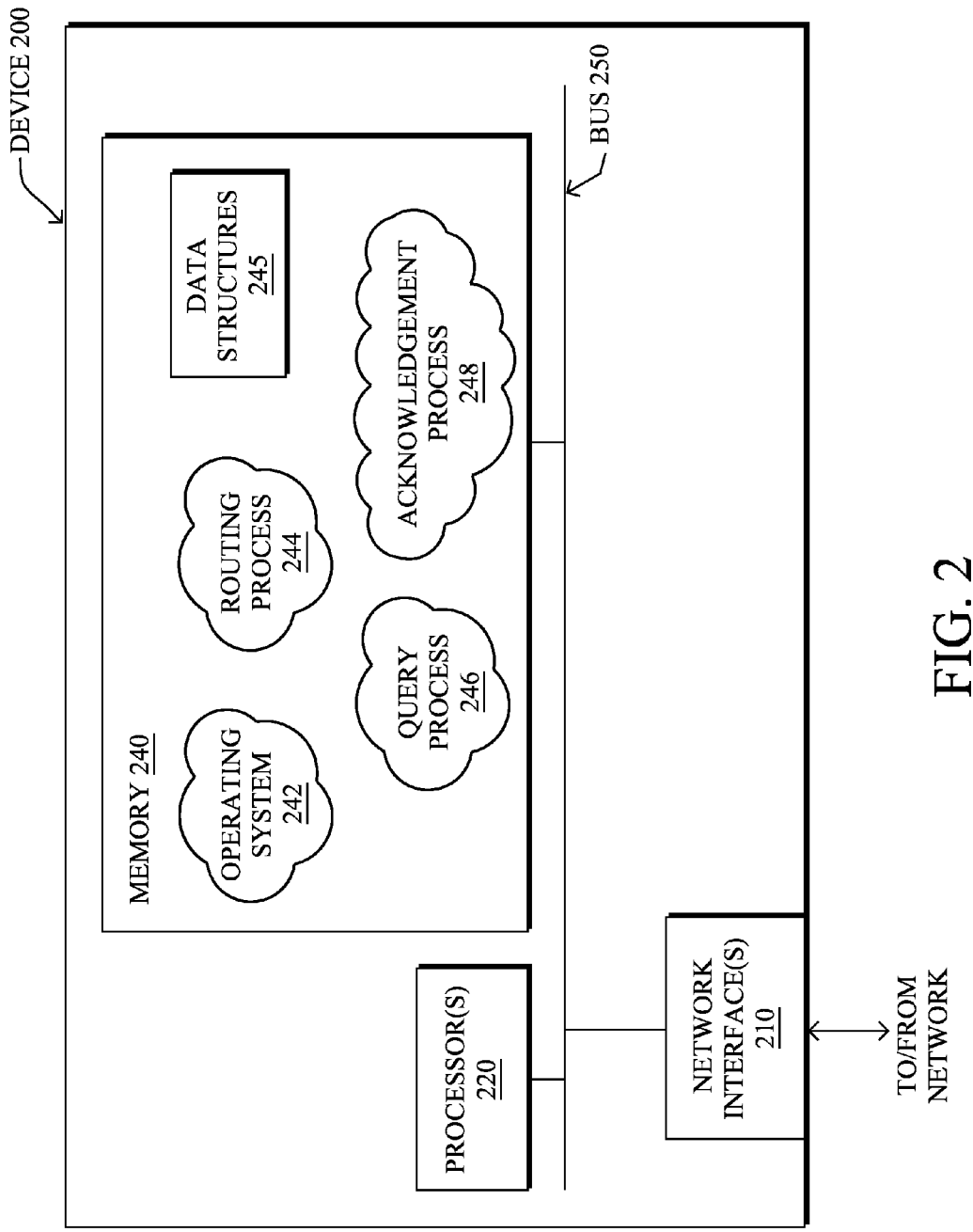
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless,), at least one processor 220, and a memory 240, all interconnected by a system bus 250.

The network interface(s) 210 comprise the mechanical, electrical, and signaling circuitry for communicating data over links 105 coupled to computer network 100. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by processor 220 and network interfaces 210 for storing software programs and data structures associated with the embodiments described herein. Processor 220 may comprise hardware elements or hardware logic adapted to execute the software programs and manipulate data structures 245. An operating system 242, portions of which are typically resident in memory 240 and executed by processor 220, functionally organizes the device by, inter alia, invoking operations in support of software processes and/or services executing on the device. These software processes and/or services may comprise routing process/services 244 and an illustrative query process 246 and acknowledgement process 248, as described herein. Note that while routing process 244, query process 246, and acknowledgement process 248 are shown in centralized memory 240, certain embodiments provide for the processes (or portions thereof) to be specifically operated within the network interfaces 210, such as a component of a MAC layer.

In the examples shown, query process 246 can be initiated by a device 200 that is immediately downstream from a node or link failure to verify what portions of the existing multicast tree(s), if any, will remain joined through the device. Acknowledgement process 248 is used by devices 200 that are downstream from the device 200 sending the query to confirm or reject continued membership in the tree in question.

Device 200 also has a unicast control plane and a multicast control plane (part of data structures 245) that are linked together to ensure that the multicast control plane does not converge before information is known and processed by all nodes on the particular tree. Depending on which unicast routing protocol is being used, different element of the protocol provides the linkage (e.g., OSPF=LSA Version, ISIS=LSP Version).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 comprises computer executable instructions executed by processor 220 to perform functions provided by one or more routing protocols, such as proactive or reactive routing protocols as will be understood by those skilled in the art. These functions may, on capable devices, be configured to manage a routing/forwarding table (a data structure 245) used to make routing/forwarding decisions for data packets. In particular, in proactive routing, connectivity is discovered and known prior to computing routes to any destination in the network, e.g., link state routing such as Open Shortest Path First (OSPF), Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination.

Figure 3:
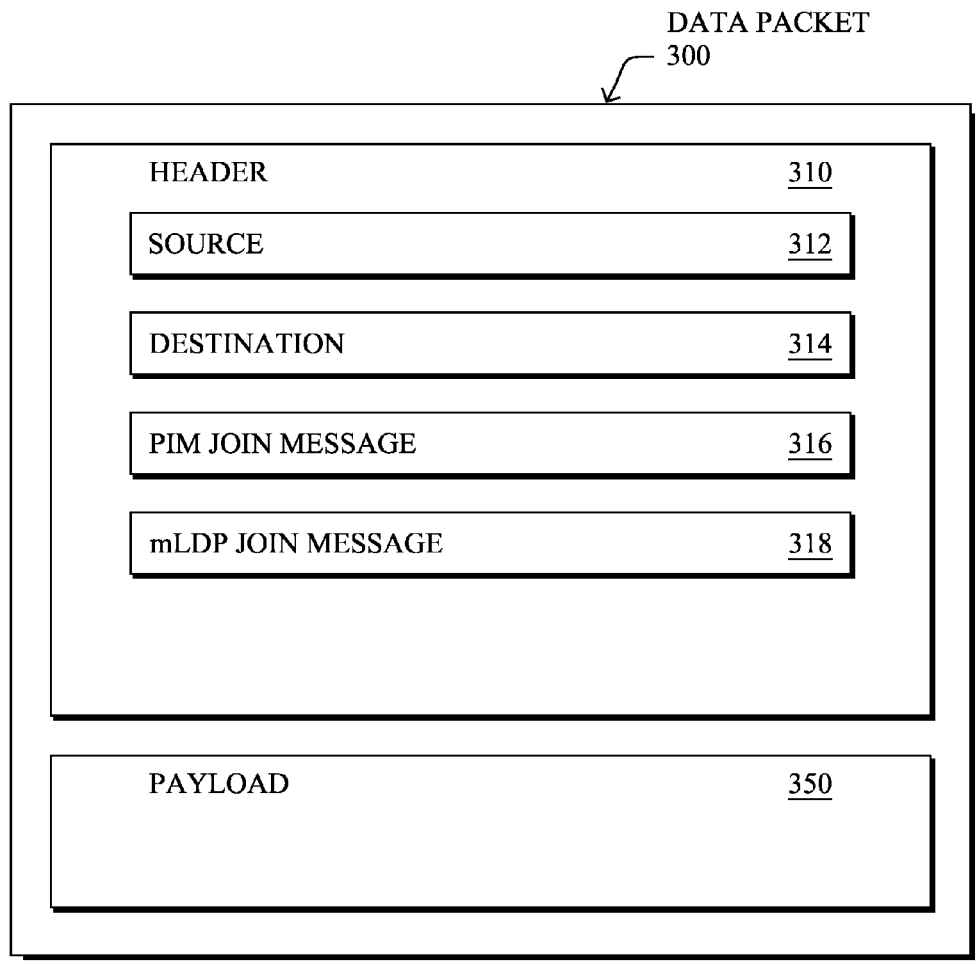
FIG. 3 illustrates an example data packet.

FIG. 3 illustrates an example simplified data packet 300. Data packet 300 includes a header 310 and a payload 350. Within the header 310 may be one or more various fields for directing the data packet 300, such as a source address 312, a destination address 314, an enhanced PIM Join Message 316, and an enhanced mLDP Label Map Message 318. The enhanced PIM Join Message 316 and enhanced mLDP Label Map Message 318 are used to support a convergence bit to inform the remainder of the tree of events that will change the tree structure.

As noted above, in computer networks 100, packets of data 140 are sent from a source to a destination using a number of nodes 200 and links 105 according to various routing protocols. In unicast routing, data packets 140 are directed along one or a plurality of links 105 away from a single source towards a single destination. Each node 200 in the path looks at the destination address 314 and forwards it to the next-hop node along the best known path to the target destination. New data packets 140 may be introduced to the computer network 100 at the single source injection point.

Figure 4:
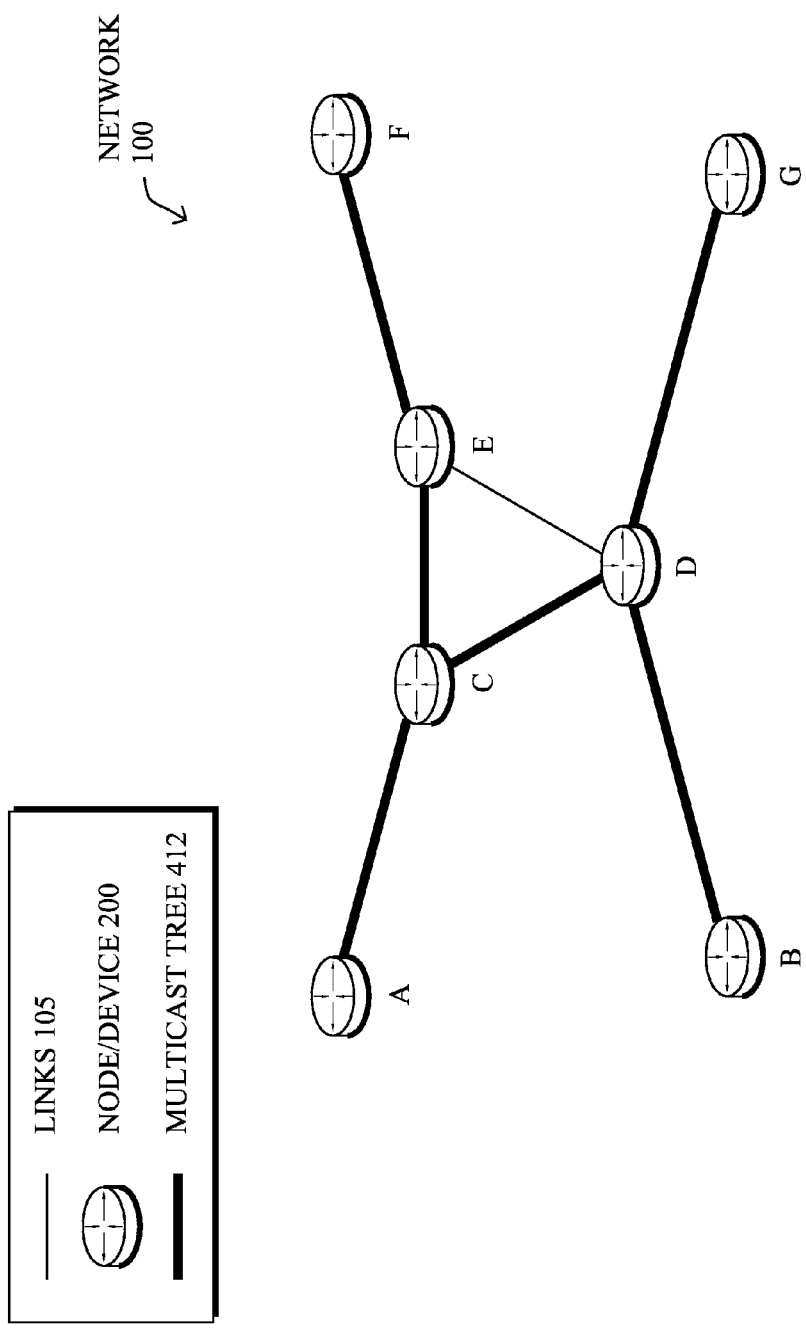
FIG. 4 illustrates an example of a multicast tree in the communication network of FIG. 1.

In multicast routing, however, the data packet's destination address 314 is a multicast group address. This allows a single data packet 300 to be forwarded to a select set of multiple nodes in the multicast group. Devices 200 within computer network 100 are able to build packet distribution trees that allow sources to send data packets 140 to all receiving nodes. For instance, FIG. 4 illustrates an example of a simplified multicast tree 412, through which data packets 140 can be distributed to multiple receivers using a number of nodes 200 and links 105.

Figure 5:
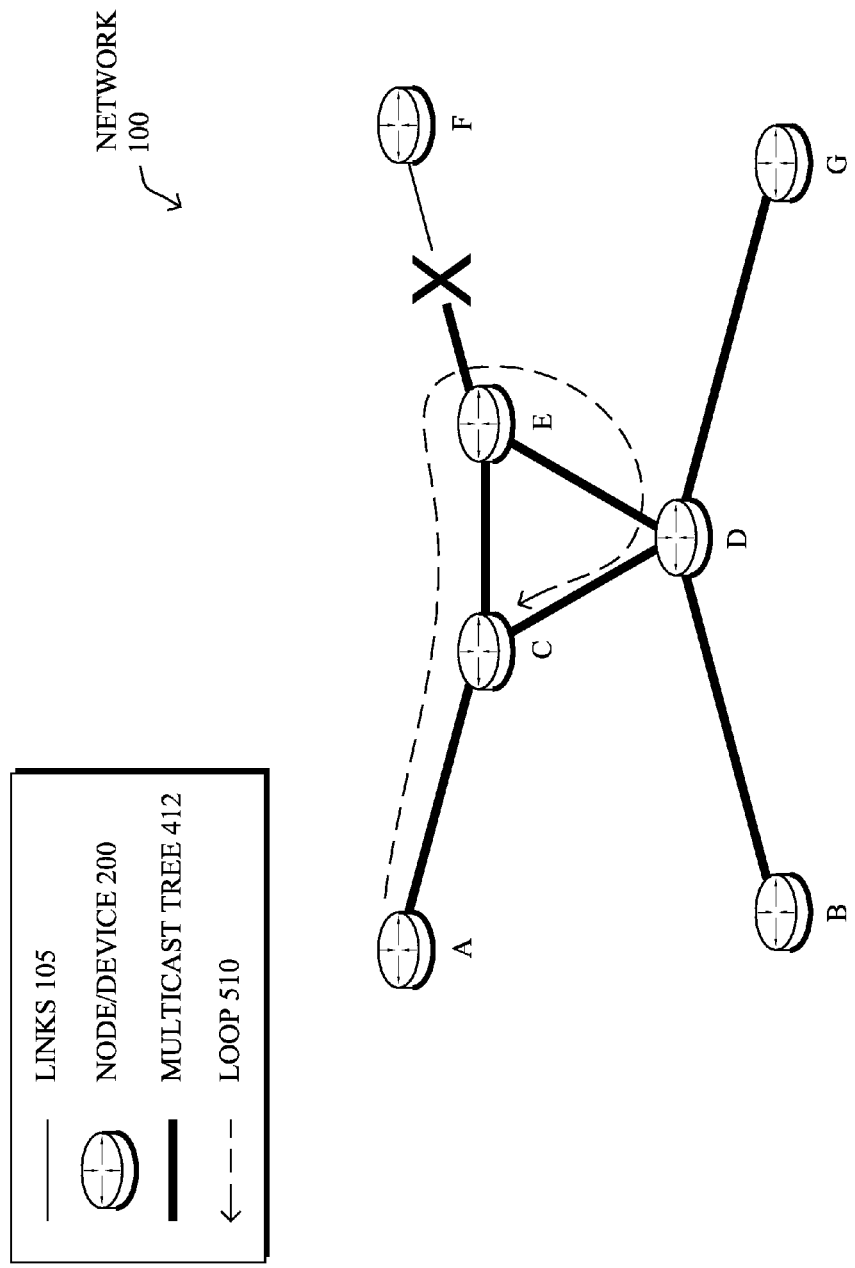
FIG. 5 illustrates the example multicast tree of FIG. 5 with a link/node failure.

As also noted above, when errors or failures are present in the network, loops can form where packets are endlessly forwarded. As shown in FIG. 5, for example, a routing loop 510 may occur when the path to a particular destination forms a loop among a group of nodes 200. For example, as shown, device "E" may have determined a failure of its E-F link, or else may be otherwise misconfigured, and forwards the packet 300 to device "D". Upon receipt, device D forwards the packet to device "C" according to its vision of the multicast tree, and then device C sends the packet again to device E to repeat the loop. The data packet 300 thus continues to be routed in an endless circle around the loop 510. While the routing loop 510 persists in the computer network 100, the data packets 140 will "hang" and/or are not delivered to the destinations.

Loops in general are problematic in computer networks, though in multicast routing, there may be multiple source injection points for new data packets 140, making it very likely that the routing loop 510 is continuously fed with new packets for as long as the loop exists. This can cause a packet storm in the computer network 100 with severe consequences, such as increased latency and potential network disruption.

When a routing loop 510 occurs in a computer network 100, the computer network 100 may converge to address the looping error. "Network convergence" is the process of synchronizing network forwarding tables (e.g., the unicast control plane and multicast control plane in data structure 245) after a topology change. The computer network 100 is said to be converged when all of the forwarding tables are synchronized across the network, relative to the position of each device in the topology. Network convergence is also known as network restoration since it heals the lost or blocked connections.

Furthermore, as mentioned above, in an IP Multicast network where IP Multicast tree building is managed by either PIM or mLDP, the Unicast control plane plays a fundamental role in ensuring that the information provided to the Multicast control plane is accurate from the perspective of what the current network topology actually is. When the network experiences a link and/or node failure, there is a significant chance that the Multicast control plane, in the effort of trying to restore connectivity for the IP Multicast traffic, will act before the Unicast control plane it is dependent on has been able to converge and reflect the updated topology. The reason for this behavior is that networks supporting IP Multicast services rely on multiple, "ships-in-the-night," protocols that act independently to build and maintain the necessary state that is associated with the successful delivery of IP Multicast traffic.

IP Multicast relies on the Unicast control plane for ensuring that the upstream path towards the Source or Root of a multicast tree uses the shortest path, from an interior gateway protocol (IGP) metric point of view, and that this path is loop-free. During situations where a network experiences either link or node failures, these conditions cause the IGP routing information to become non-synchronized across the network for a given period of time, which is variable and related to the size of the network and the configuration and processing power of the routers in the network.

For IP Multicast, this commonly causes an upstream router (closer to the failure) to converge its Unicast table faster than those routers further downstream (away from the failure). This subsequently triggers Multicast control plane messages to attempt to restore connectivity. If the downstream routers receive these Multicast control plane messages before they have been able to complete convergence of their Unicast routing table, the receiving Multicast control plane will act on the information at hand. Even though the information at hand is stale, this predicament is unknown to the Multicast control plane. This behavior is the cause of multiple problems that are of growing concern in IP Multicast deployments, such as:

- The creation of loops, either locally or multiple hops away. This is primarily a concern in PIM Bi-Dir or MP2MP mLDP networks as any receiver is also a source. In a PIM SSM/SM or P2MP mLDP network, the source is cut off from the loop.
- Unnecessary control plan churn, where partial or complete trees might be built only to be torn down when Unicast routing finally converges and the Multicast control plane is made aware of the update topology. This is an issue for all PIM and mLDP networks.
- Delayed convergence due to the unnecessary control plane churn.
- Traffic storms, caused primarily by the loops, affecting both Unicast and Multicast traffic.
- Temporary use of paths that might not have been sized for the additional Multicast traffic, affecting both Unicast and Multicast traffic.
- Make Before Break (MBB) problems. MBB works best if just one node on the tree applies the MBB procedures. It's possible (depending on the topology) that multiple routers will start the MBB procedure at the same time, which will make the MBB less predictable and can cause undesired traffic loss.

This missing link in the overall IP Multicast architecture is of significant concern and can be a showstopper for the successful deployment of scalable and reliable IP Multicast Services.

The techniques herein provide a control plane technique for avoiding loops and unnecessary churn during multicast convergence. This is achieved through a query/acknowledge process that links to topology information held in the unicast control plane to ensure that multicast and unicast act together in an interactive fashion.

Illustratively, the techniques described herein may be performed by hardware, software, and/or firmware, such as in accordance with the query process 246 and acknowledgement process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various routing protocols, and as such, may be processed by similar components understood in the art that execute those protocols, accordingly.

Specifically, according to one or more embodiments of the disclosure as described in detail below, existing IP multicast control plane protocols are equipped with the necessary linkage to the unicast control plane to understand when and what topology change happen and what element of information that must have been processed in any node before IP multicast convergence can commence. Furthermore, the IP multicast control plane is equipped with the ability to verify that the necessary information for convergence has been propagated all the way to the leaf(s) of the tree and whether or not downstream IP multicast routers are to remain on the tree. This allows all the nodes along the multicast tree to act based on information that has been acknowledged from the leaves of the tree to the point of failure in the same tree. This eliminates both loop conditions as well as IP multicast control plane churn, together with the associated problems as described above.

Figure 6:
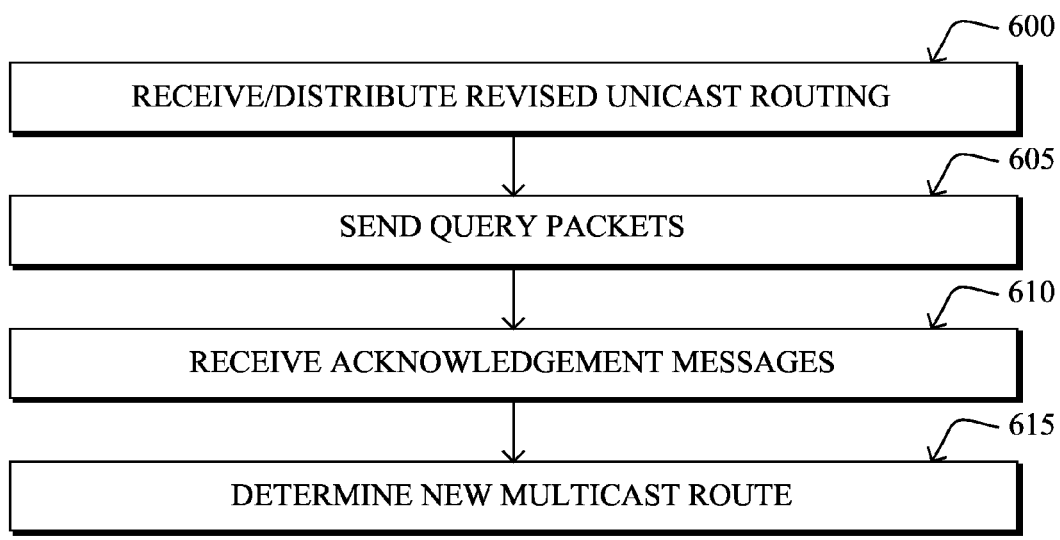
FIG. 6 illustrates an example of a procedure for acknowledged multicast convergence.
Figure 7:
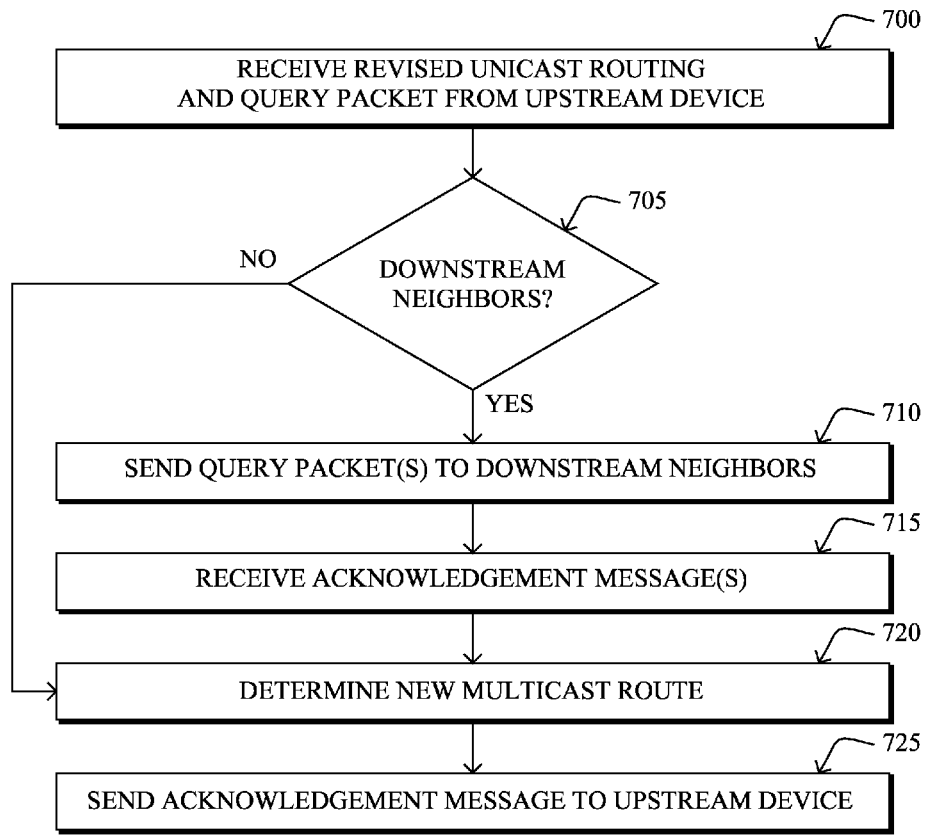
FIG. 7 illustrates another example of a procedure for acknowledged multicast convergence.

Illustrative processes for acknowledged multicast convergence are shown in FIGS. 6 and 7, which ensure that convergence of the multicast control plane only occurs after the required devices/nodes in the affected multicast tree have processed the required unicast control plane updates.

In the illustrative process described below, a device/node, referred to herein as Device (A), has an upstream link towards a source/root of a multicast tree and several downstream neighbors that are joined onto that same tree. Upon failure of the current upstream link used by Device (A) to reach the source/root, Device (A) will have various options, based on the topology in which it is operating, and the described processes may use to reconnect with the source/root and repair the tree.

Referring to FIG. 6, an exemplary process is shown that can be used by Device (A). In this process, at Step 600, Device (A) receives and distributes information on the required revision of unicast routing to its downstream neighbors on the multicast tree. This is done so that the correct unicast topology is in place so that each node/device can make an informed decision related to the multicast topology, as described below.

At Step 605, Device (A) originates a query packet, via query process 246, and sends the query-packet to the nodes/devices directly connected to Device (A) and located downstream on the affected trees. Device (A) can also set a query timer at this point. To determine what action(s) to take, Device (A) must find out from its downstream neighbors what they require in the new topology. Before any change in the multicast state is made, Device (A) uses the query process 246 to learn about what the neighbors downstream on the multicast tree require before taking any action to change the tree structure using the required multicast control plane. In this example, the query packet contains information on the affected source/root and on the revision of unicast routing that is required. In this manner, one query packet carrying information on the set of affected source/root-addresses is originated and distributed down the affected trees.

At Step 610, Device (A) receives acknowledgement messages from its downstream neighbors on the multicast tree in response to the query packets.

At Step 615, Device (A) determines what actions to take based on the revised unicast routing and the acknowledgement messages received from its downstream neighbors on the multicast tree. For example, based on the revised unicast routing and the acknowledgement messages, Device (A) can: (1) use an alternate upstream link (if it exists); (2) use a path through one of the downstream neighbors; or (3) release all state if Device (A) is no longer of any use on the tree. To determine which action to take, Device (A) will:
(1) Review the revised unicast topology reflecting the loss of the previously referenced link;
(2) Review the acknowledgement messages from the downstream neighbors on what their requirements are after taking the topology change into account; and
(3) Make an assessment of if/how Device (A) will be used, taking into account the revised unicast routing and the acknowledgement messages, while also considering if there are any locally attached receivers for the tree.

Once Device (A) has computed the new unicast topology, it will know what role to play in relation to the multicast tree in question. For example:
If there is no alternate upstream link to the source/root device, all downstream neighbors find other paths, and Device (A) has no local receivers, Device (A) can remove itself from the multicast tree entirely.
If there is no alternate upstream link to the source/root device, but there is an alternate path to the source/root device through a downstream neighbor, and local receivers and/or other downstream neighbors require that Device (A) remain on the multicast tree, Device (A) will join the tree through the downstream neighbor (without causing any loops).
If Device (A) determines that the shortest path to the source/root device in the updated unicast topology goes through one of the downstream neighbors, a different mechanism may be used to speed up convergence. For example, Device (A) will still query the neighbors that remain downstream on the tree, but for establishing a branch through the downstream neighbor, Device (A) will originate a PIM Join/mLDP Label Map with the convergence bit set. This informs the downstream neighbor of the fact that Device (A) now uses the downstream neighbor as a shortest path, even if the unicast routing of the downstream neighbor has not converged to reflect that situation. Since it is well known to store messages that do not immediately make sense, at least for some situations, the downstream neighbor will then know that if an upcoming unicast convergence results in a new topology, the message originated by Device (A) might make sense and can be processed before other messages that may be stored for other reasons.
If there is an alternate upstream link towards the source/root device, Device (A) can rejoin the multicast tree using this new path. However, Device (A) should still find out if its services are needed in the new topology. If there are local receivers or the new path has an equal metric to the previous one that failed, then its services are needed. If there are no local receivers and the metric changes, then Device (A) may no longer be needed in the multicast tree and can remove itself form the multicast tree entirely.

Referring now to FIG. 7, an exemplary process is shown that can be used by a downstream device in the multicast tree.

At Step 700, the downstream device receives the revised unicast routing and the query packet from Device (A).

Once each downstream neighboring device receives the revised unicast routing and the query packet from Device (A), at Step 705 it determines whether it has any downstream neighbors that are also part of the multicast tree. If it does, the process continues with Step 710. If it does not, the process continues with Step 720.

At Step 710, the each downstream neighboring device initiates an identical process of sending the revised unicast routing and a query packet to their directly connected neighbors located further downstream in the tree, using query process 246. Query process 246 is executed hop-by-hop, such that each layer of downstream nodes/devices makes an independent decision about if and who to issue query packets in the downstream direction. The overall purpose of query process 246 is to ensure that each layer of downstream nodes/devices has converged onto the revised unicast topology before a decision is made about whether to stay on the existing tree or to create a new branch.

At Step 715, each downstream neighboring device receives an acknowledgement message from its directly connected neighbors. As soon as unicast convergence has completed, each downstream node/device responds back to their querying upstream neighbor using acknowledgement process 248 with an acknowledgement message reporting whether or not it will stay on the existing branch. Each querying node/device can then determine an action on a per branch, or downstream neighbor, basis whether or not to keep the existing multicast state.

At Step 720, each downstream neighboring device will determine what action to take based on the revised unicast routing and the acknowledgement messages received, if any. Once a downstream neighboring device in the multicast tree has received and processed the required unicast routing update and acknowledgement messages from downstream neighbors, it will know whether or not it will remain on the existing multicast tree and can take action to either confirm existing multicast state or prune it. For example:
If the new unicast topology points to the existing multicast tree as being the shortest path to the source/root device, and the downstream neighboring device has local receivers, the downstream neighboring device will prepare an acknowledge message indicating that it wants to stay on the multicast tree.
If the downstream neighboring device has downstream neighbors and no local receivers, the new unicast topology points to the existing multicast tree as being the shortest path to the source/root device, and an acknowledgement message has been received that a downstream neighbor wants to stay on the multicast tree, the downstream neighboring device will prepare an acknowledgement message indicating that it wants to stay on the multicast tree.
If the revised unicast topology identifies an alternate route as being the shortest path towards the source/root device, the downstream neighboring device can immediately begin pruning the existing multicast state and begin creating state along the newly found path. The downstream neighboring device will originate a PIM Prune/mLDP Label Release with a wildcard for all groups using the identified source/root device and issue the downstream query packets messages for the downstream neighbors on the tree before beginning to build state along the new shortest path, unless there are local receivers in which case the new branch can be built immediately. The downstream neighboring device will then prepare an acknowledgement message indicating that it will no longer stay on the current branch of the multicast tree.
If the revised unicast topology points to the existing path as being the shortest path towards the source/root device, but no local receivers exist and all downstream neighbors originate acknowledgement messages indicating they will no longer stay on the current branch of the multicast tree, the downstream neighboring device will then prepare an acknowledgement message indicating that it will no longer stay on the current branch of the multicast tree.

If the query timer for originating query packets expires, the downstream neighboring device will fallback to well known Make Before Break processing, after which the downstream neighboring device should then prepare an acknowledgement message indicating that it will no longer stay on the current branch of the multicast tree.

In case a situation arises where either a downstream query packet or upstream acknowledgement message is lost for any reason, the multicast control plane in use will simply fall back to existing convergence rules for that particular protocol. This will probably only occur with PIM, since mLDP relies on TCP for delivery.

Once the downstream neighboring device determines the action to take and prepares the appropriate acknowledgement message, the acknowledgement message is sent to upstream Device (A) at Step 725.

The techniques described above provide the necessary mechanics for converging a multicast topology with the following benefits:

- Elimination of loops, since the multicast topology doesn't change until each node is equipped with accurate information.
- Elimination of unnecessary control plane churn, since each node doesn't take any action until it is equipped with accurate information.
- More reliable Make-Before-Break convergence, since the nodes converge in an ordered manner.

The above processes provide an end-to-end multicast convergence mechanism that is executed in a controlled fashion. The end-to-end aspect by nature produces some delay in convergence of a multicast network, but since each step is triggered by the completion of unicast routing convergence, it is unlikely that the end-to-end convergence times will be significantly longer than without the described processes. In using the described processes, loops during convergence and control plane churn caused by partial tree building are avoided entirely.

When this architecture is scaled to an environment that supports a number of sources and a large number of groups and trees, there will be an increased load on the control plane from executing the additional measures that are required for converging in a controlled fashion. However, the impact of these operations should be contrasted with the already well established downside of looping traffic in the forwarding plane. The effects will also be alleviated by the lack of other redundant control plane traffic as caused by the partial tree building operations.

In addition, there may be benefits to coupling this architecture with the use of loop-free alternate (LFA) or equal cost multipath (ECMP) paths for important source/root locations, such that backups could be found for certain scenarios quickly and without having to engage this function. These unicast protection measures are highly unlikely to exist for all potential faults in a network and hence a complete loop elimination scheme for multicast should include the above described processes as well.

Figure 8:
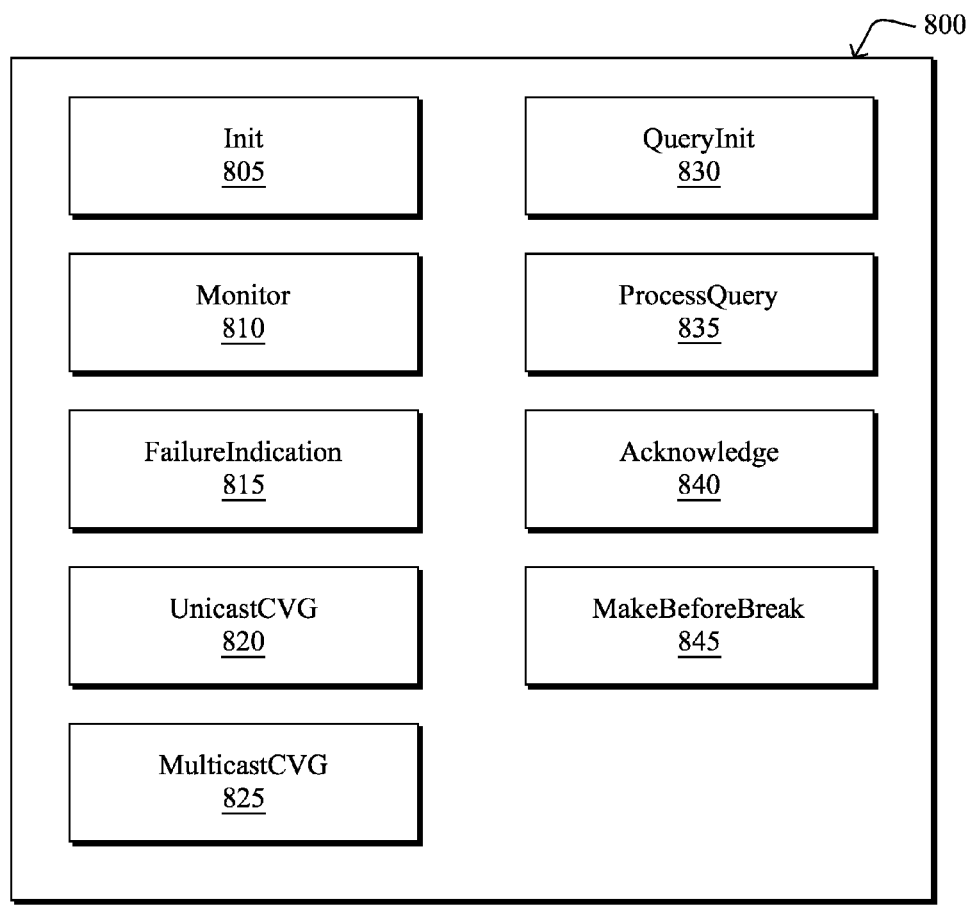
FIG. 8 illustrates an example of a state machine for acknowledged multicast convergence.

FIG. 8 illustrates and illustrative state machine 800 that could be used to implement the techniques described above. In the example shown, the defined states for acknowledged multicast convergence in state machine 800 are:

Init 805;
Monitor 810;
FailureIndication 815;
UnicastCVG 820;
MulticastCVG 825;
QueryInit 830;
ProcessQuery 835;
Acknowledge 840; and
MakeBeforeBreak 845.

State machine 800 is kept per source/root IP-address and per downstream neighbor for the ability to manage convergence events at the appropriate level of granularity as they occur. Exemplary details on the defined states and the actions that may be taken in each state are described below.

Init State 805

Init State 805 is the initial state and state machine 800 is put into this state when a tree is first created, or when the local node is first grafted onto a tree. It is not necessary for the tree to have any downstream neighbors since certain operations in state machine 800 are applicable to nodes that are only operating in a leaf capacity.

In response to a new tree being created, state machine 800 will register the source/root. To do this, the source/root of the tree is identified and communicated to RIB for tracking, the unicast control protocol managing the source/root is identified; and the monitor state for the newly added source/root is entered.

In response to the last tree being deleted for a source/root, state machine 800 will unregister the source/root and delete the instance for the source/root.

All other events are ignored in Init State 805.

Monitor State 810

In Monitor State 810, the source/root has been recognized by the local device/node and is being monitored for any changes that will require action by state machine 800.

In response to a downstream neighbor being added for any tree rooted at the source/root the downstream neighbor is added to the neighbor list for the source/root.

In response to a downstream neighbor being pruned from all trees, the neighbor is removed from the neighbor list for the source/root.

In response to the all trees for a certain source/root being deleted, the state machine 800 instance for the source/root is deleted.

In response to a FailureIndicationReceived Event, state machine 800 enters FailureIndication State 815.

In response to a MulticastControlReceived Event, state machine 800 enters Multicast CVG State 825.

In response to receiving a query packet, state machine 800 enters ProcessQuery State 835.

In response to receiving an acknowledgement message, state machine 800 enters Acknowledgement State 840.

In response to a TimerExpired event, state machine 800 enters MakeBeforeBreak State 845.

In response to the QueryRcvdChk Flag being sent, state machine 800 enters ProcessQuery State 835 at regular intervals.

FailureIndication State 815

In Failure Indication State 815, the failures that are communicated to the multicast control plane are processed.

In response to a Local RPF-Link Failure, state machine 800 will identify affected trees and create a list of affected downstream neighbors, add the source/root to the active list for a source/root with downstream multicast control plane neighbors, and enter UnicastCVG State 820 with an RFP Flag set if the active list is not empty. Otherwise, state machine 800 will enter Monitor State 810.

In response to a Local Downlink Failure, state machine 800 enters UnicastCVG State 820 with the RPF Flag unset.

In response to receiving a unicast update, state machine 800 enters UnicastCVG State 820 with the UnicastUpdate Flag set.

In response to receiving a multicast update, state machine 800 enters Multicast CVG 825 with the MulticastUpdate Flag set.

UnicastCVG State 820

In UnicastCVG State 820 the unicast convergence is monitored and allowed to complete for the local system before further action is taken to ensure that an informed decision can be made and that the required version information is available for retrieval by the query and acknowledgment processes.

In response to the completion of a unicast convergence:

If the RPF-flag is set:
 If a new RPF-interface is found and the new RPF-interface is congruent with the affected source/root path, a Congruent Flag is set, and state machine 800 enters QueryInit State 830.
 If a new RPF-interface is found and the new RPF-interface is non-congruent with the affected source/root path, the Congruent Flag is unset, and state machine 800 enters QueryInit State 830.
If the RPF-flag is not set, state machine 800 sets ReleaseAllFlag for the affected source/root and enters MulticastCVG State 825.
If the RPF-flag is unset, state machine 800 enters MulticastCVG State 825.
If the UnicastUpdate Flag is set:
 If a new RPF-interface is found and the new RPF-interface is congruent with the affected source/root path, a Congruent Flag is set, and state machine 800 enters MulticastCVG State 825.
 If a new RPF-interface is found and the new RPF-interface is non-congruent with the affected source/root path, the Congruent Flag is unset, and state machine 800 enters QueryInit State 830.
If the RPF-flag is not set, state machine 800 sets ReleaseAllFlag for the affected source/root and enters MulticastCVG State 825.

MulticastCVG State 825

In MulticastCVG State 825, any received multicast control updates are processed and checked for validity.

In response to the ReleaseAll Flag being set, state machine 800 originates a release message with a wildcard, deletes all affected trees from the Active List, and enters Monitor State 810.

In response to receipt of the PIM or mLDP, state machine 800 stores the update in cache and enters Monitor State 810.

In response to receiving a PIM/mLDP message with a convergence bit set, state machine 800 determines if the correct version unicast routing was used. If the correct version was used, state machine 800 processes the message and enters Monitor State 810. If the correct version was not used, state machine 800 stores the message for later processing and enters Monitor States 810.

In response to other PIM/mLDP messages, state machine 800 processes the message and enters Monitor State 810.

In response to a McOriginateMsg Flag, state machine 800 originates the relevant control plane message and enters Monitor State 810.

QueryInit State 830

In QueryInit State 830, all query processing is initiated based on the position of the local node in relation to the affected source/root and received query packets from upstream neighbors.

In response to the Congruent Flag being unset, state machine 800 originates downstream queries for the source/root being processed to the nodes in the neighbor list, starts a query timer for the source/root, and enters Monitor State 810.

ProcessQuery State 835

In ProcessQuery State 835, any query packets that are received are processed and managed properly to generate further downstream queries and/or trigger corresponding acknowledgement messages or time out the query operation.

In response to receiving a query packet, state machine 800 confirms that the unicast convergence is complete for the related update specified by the query packet. If the unicast convergence is not complete, state machine 800 waits or enters Monitor State 810 with the QueryRcvdChk Flag. If the unicast convergence is complete, state machine 800 checks if downstream queries are required for the source/root that the received query packet pertained to. If downstream queries are needed, state machine 800 enters QueryInit State 830. If downstream queries are not needed, state machine 800 enters Acknowledge State 840.

In response to an expired timer for any downstream query on a queried source/root, state machine 800 deletes the outstanding queries from the neighbor list and enters MakeBeforeBreak State 845.

Acknowledge State 840

In the Acknowledge State 840, the received acknowledgement messages matching outstanding query packets are processed and active sources/roots are taken off the active list as soon as all outstanding queries are settled.

In response to an acknowledgement message being received, state machine 800 determines if the acknowledgement message is the final outstanding query for a source/root. If it is, the source/root is removed from the active list and the timer for the source/root is cleared. If it is not, state machine 800 determines if the timer has expired for the source/root. If the timer has expired, source/root is removed from the active list and state machine 800 enters MakeBeforeBreak State 845. If it has not expired, state machine 800 determines if the acknowledgement message indicates ON TREE. If it does, state machine 800 refreshes the state and enters Monitor State 810. If it does not, state machine 800 clear the state and enters Monitor State 810.

MakeBeforeBreak State 845

In MakeBeforeBreak State 845, state machine 800 has given up on the source/root in question and enters Make Before Break to determine if the source/root path can be resurrected that way and enters Monitor State 810.

The techniques described herein inherently aggregate multicast convergence around the established aggregation of multicast state around Unicast Source or Root IP-addresses. Loops and control plane churn are avoided completely since the linkage between the unicast and multicast control planed provides for the required synchronization to do so.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a first device in a multicast tree that is immediately downstream of a failure in the multicast tree, data indicative of a revised unicast routing topology;
   distributing, by the first device, the data indicative of the revised unicast routing topology to a downstream device of the first device in the multicast tree;
   sending, by the first device, a query to the downstream device of the first device in the multicast tree regarding the distributed data indicative of the revised unicast routing topology, prior to the multicast tree being updated;
   receiving, at the first device, an acknowledgement message from the downstream device of the first device in the multicast tree based on the query; and
   determining, by the first device, a change to the multicast tree based on the data indicative of the revised unicast routing topology and on the acknowledgement message received from the downstream device of the first device.

2. The method of claim 1, wherein the query comprises information regarding an affected root device of the multicast tree.

3. The method of claim 1, wherein determining the change to the multicast tree comprises:
   identifying, by the first device, an alternate upstream link to a root device of the multicast tree; the method further comprising:
   implementing, by the first device, the change to the multicast tree by updating the multicast tree to include the alternate upstream link.

4. The method of claim 3, wherein the acknowledgement message comprises a request that the downstream device of the first device in the multicast tree remains in the multicast tree after the change to the multicast tree is implemented.

5. The method of claim 1, wherein determining the change to the multicast tree comprises:
   determining, by the first device, an alternate path to a root device of the multicast tree through an alternate downstream device of the first device in the multicast tree; the method further comprising:
   implementing, by the first device, the change to the multicast tree by updating the multicast tree to include the alternate path to the root device through the alternate downstream device of the first device in the multicast tree.

6. The method of claim 5, wherein the acknowledgment message comprises an indication that the downstream device of the first device in the multicast tree identified the alternate path to the root device.

7. The method of claim 1, wherein determining the change to the multicast tree comprises:
   determining, by the first device, that the first device should leave the multicast tree; the method further comprising:
   implementing, by the first device, the change to the multicast tree by causing the first device and the downstream device of the first device in the multicast tree to leave the multicast tree.

8. The method as in claim 1, wherein the downstream device of the first device in the multicast tree sends the acknowledgement message after receiving a corresponding acknowledgement from one or more devices that are further downstream of the downstream device of the first device in the multicast tree.

9. An apparatus, comprising:
   a network interface configured to communicate over a network;
   a processor coupled to the network interface and configured to execute a process; and
   a memory configured to store the process executable by the processor, the process when executed comprising:
   receiving data indicative of a revised unicast routing topology, in response to a failure in a multicast tree immediately upstream of the apparatus;
   distributing the data indicative of the revised unicast routing topology to a downstream device of the apparatus in the multicast tree;
   sending a query to the downstream device of the apparatus in the multicast tree regarding the distributed data indicative of the revised unicast topology, prior to the multicast tree being updated;
   receiving an acknowledgement message from the downstream device of the apparatus in the multicast tree based on the query; and
   determining a change to the multicast tree based on the revised unicast routing topology and the acknowledgement message received from the downstream device of the apparatus in the multicast tree.

10. The apparatus of claim 9, wherein the query comprises information regarding an affected root device of the multicast tree.

11. The apparatus of claim 9, wherein determining the change to the multicast tree comprises:
    identifying an alternate upstream link to a root device of the multicast tree; the process further comprising:
    implementing the change to the multicast tree by updating the multicast tree to include the alternate upstream link.

12. The apparatus of claim 11, wherein the acknowledgement message comprises a request that the downstream device of the apparatus in the multicast tree remains in the updated multicast tree after the change to the multicast tree is implemented.

13. The apparatus of claim 9, wherein determining the change to the multicast tree comprises:
    determining an alternate path to a root device of the multicast tree through an alternate downstream device of the apparatus in the multicast tree; the process further comprising:
    implementing the change to the multicast tree by updating the multicast tree to include the alternate path to the root device through the alternate downstream device of the apparatus in the multicast tree.

14. The apparatus of claim 13, wherein the acknowledgment message comprises an indication that the downstream device of the apparatus in the multicast tree identified the alternate path to the root device.

15. The apparatus of claim 9, wherein determining the change to the multicast tree comprises:
    determining that the apparatus should leave the multicast tree; the process further comprising:
    implementing the change to the multicast tree by causing the apparatus and the downstream device of the apparatus in the multicast tree to leave the multicast tree.

16. The apparatus as in claim 9, wherein the downstream device of the apparatus in the multicast tree sends the acknowledgement message after receiving a corresponding acknowledgement from one or more devices that are further downstream of the downstream device of the first device in the multicast tree.

17. A tangible non-transitory computer-readable storage medium having computer-executable instructions stored thereon that, when executed by a processor, cause the processor to perform operations comprising:

receiving, at a first device in a multicast tree that is immediately downstream of a failure in the multicast tree, data indicative of a revised unicast routing topology;

distributing, by the first device, the data indicative of the revised unicast routing topology to a downstream device of the first device in the multicast tree;

sending, by the first device, a query to the downstream device of the first device regarding the data indicative of the revised unicast routing topology, prior to the multicast tree being updated;

receiving, at the first device, an acknowledgement message from the downstream device of the first device in the multicast tree based on the query; and determining, by the first device, a change to the multicast tree based on the revised unicast routing topology and on the acknowledgement message received from the downstream device of the first device in the multicast tree.

18. The tangible non-transitory computer-readable storage medium of claim 17, wherein determining the change to the multicast tree comprises:

identifying an alternate upstream link to a root device of the multicast tree; the operations further comprising:

implementing the change to the multicast tree by updating the multicast tree to include the alternate upstream link.

19. The tangible non-transitory computer-readable storage medium of claim 17, wherein determining the change to the multicast tree comprises:

determining an alternate path to a root device of the multicast tree through an alternate downstream device of the first device in the multicast tree; the operations further comprising:

implementing the change to the multicast tree by updating the multicast tree to include the alternate path to the root device through the alternate downstream device of the first device in the multicast tree.

20. The tangible non-transitory computer-readable storage medium of claim 17, wherein determining the change to the multicast tree comprises:

determining that the first device should leave the multicast tree; the operations further comprising:

implementing the change to the multicast tree by causing the first device and the downstream device of the first device in the multicast tree to leave the multicast tree.

* * * * *